M. C. ROGERS.
OIL FILTERING OR PURIFYING DEVICE.
APPLICATION FILED FEB. 24, 1914.
1,148,990.
Patented Aug. 3, 1915.
2 SHEETS—SHEET 2.
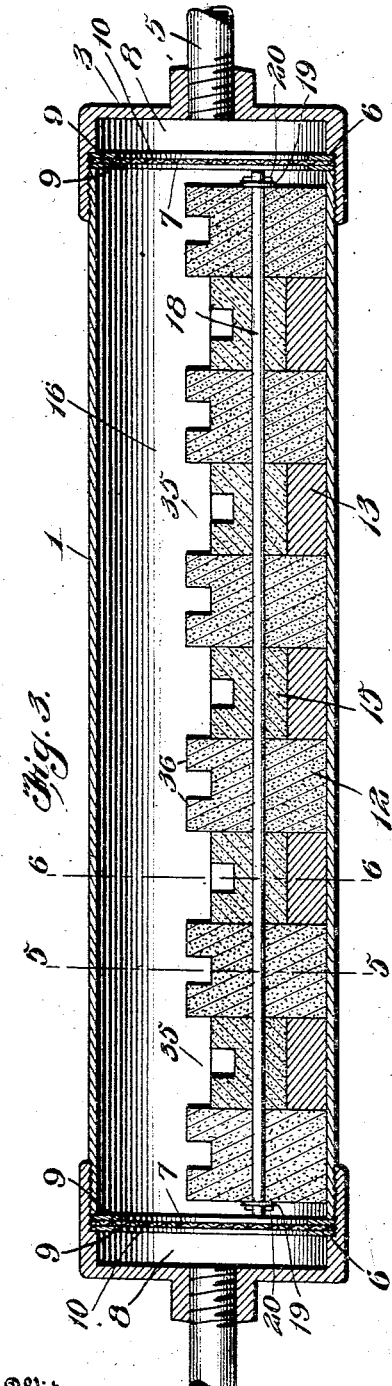
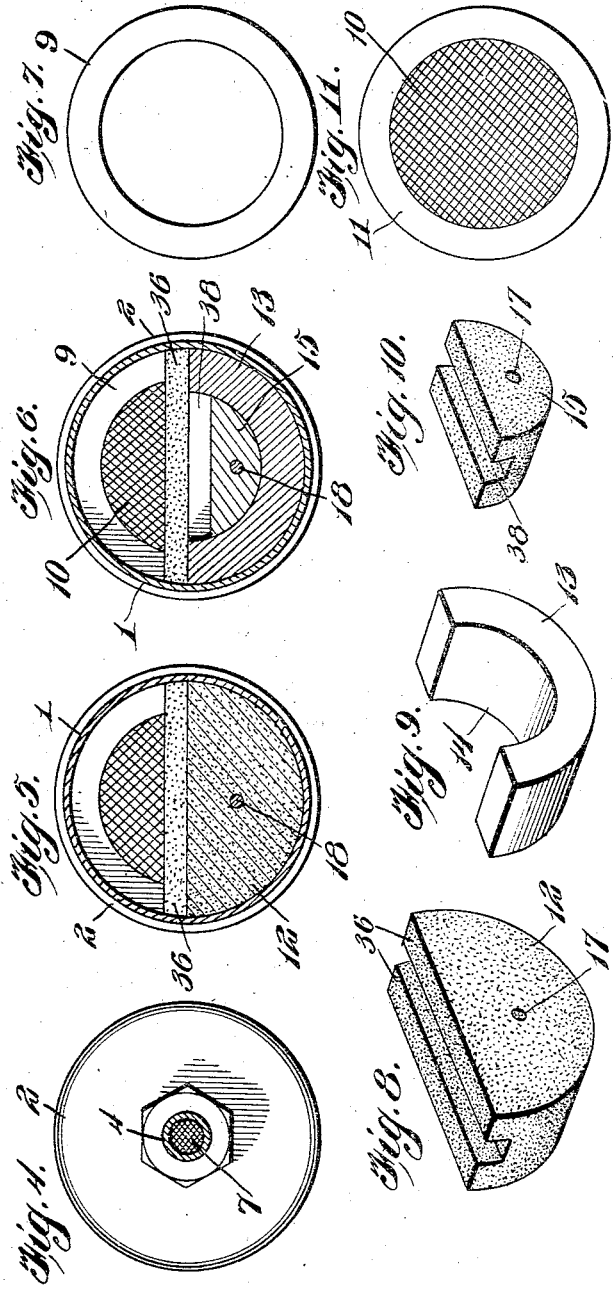
Witnesses:
J. R. Heinrichs.
Eva W. Springer.
Inventor:
Manly C. Rogers,
By C. C. Hines,
Attorney

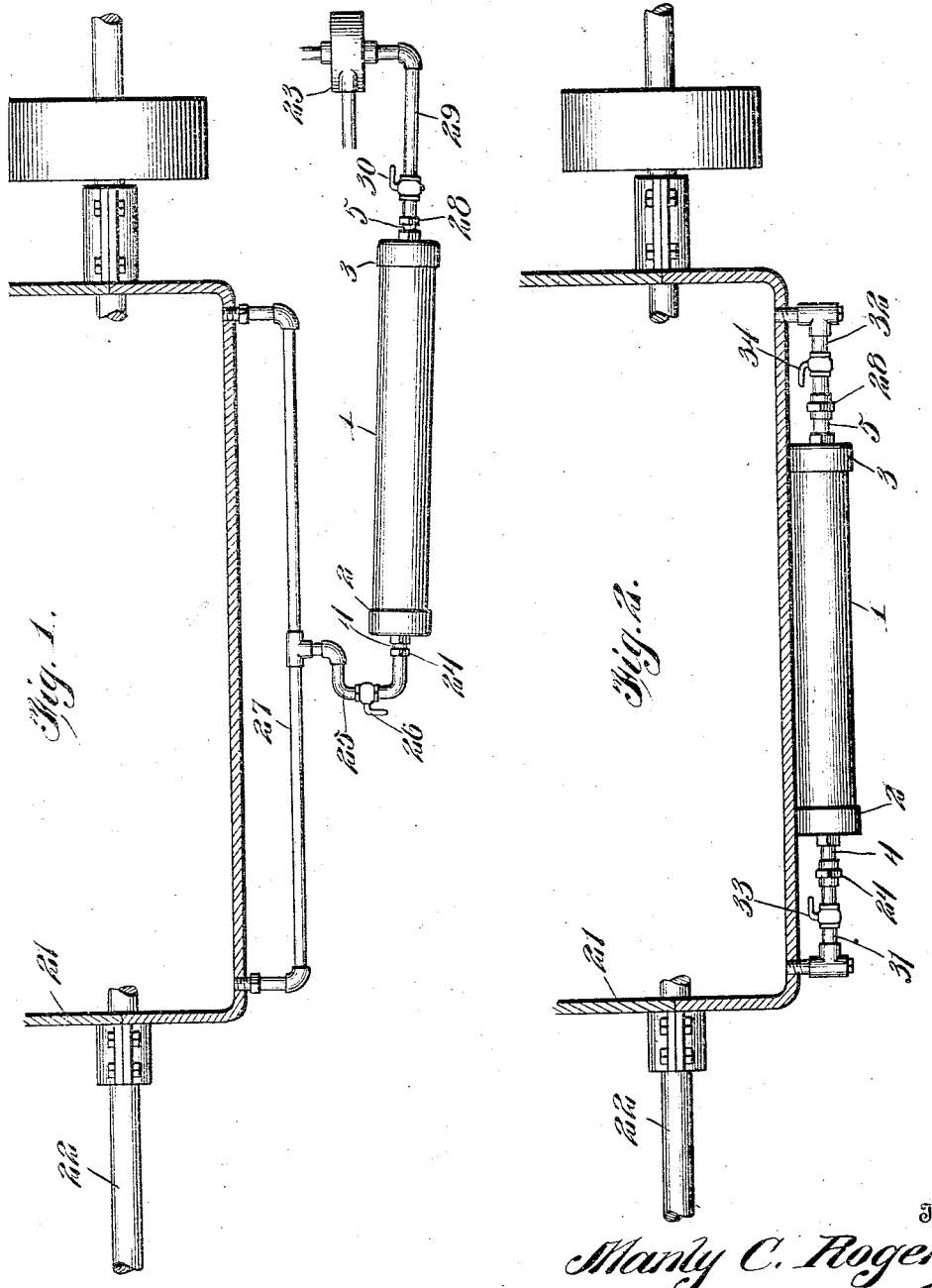

UNITED STATES PATENT OFFICE.

MANLY C. ROGERS, OF WEEHAWKEN, NEW JERSEY.

OIL FILTERING OR PURIFYING DEVICE.

1,148,990.　　　　　Specification of Letters Patent.　　　Patented Aug. 3, 1915.

Application filed February 24, 1914. Serial No. 820,573.

*To all whom it may concern:*

Be it known that I, MANLY C. ROGERS, a citizen of the United States, residing at Weehawken, in the county of Hudson and State of New Jersey, have invented new and useful Improvements in Oil Filtering or Purifying Devices, of which the following is a specification.

My invention relates to an oil filter or purifying device especially designed for use in connection with the lubricating systems of automobiles or like engines, but adapted also for use in connection with all engines, particularly of the internal combustion type, wherein oil, from a crank casing or other suitable source, is supplied to the working parts for the purpose of lubricating the same.

In engines of this character two systems of lubrication are commonly employed—the circulation or force feed system and the splash system, the crank casing of the engine serving as the reservoir or source of oil supply. In the course of time in the operation of the engine this oil becomes contaminated from the presence of dirt, carbon deposits and other foreign substances, such as iron or steel which are broken or sloughed off the working parts, and the continued supply of this oil to the engine results in decreased general efficiency, owing to the clogging of the moving elements, imperfect lubrication due to the condition of the oil, greater wear and tear from the presence of gritty matter, and the increase of carbon deposits, causing loss of power and a greater consumption of fuel in the action of the engine.

The primary object of my invention is to provide a purifying or filtering device whereby oil may be relieved of its impurities, which device may be applied to the engine in a simple and convenient manner for reliable and efficient operation.

A further object of the invention is to provide a purifying or filtering device by which the oil will be strained of all carbon deposits, dirt and other like foreign impurities, and also of any particles of metal flowing with or held in suspension in the oil.

A still further object of the invention is to provide a purifying or filtering device which may be employed with efficiency in lubricating systems of either of the types specified, and which is simple of construction and may be constructed and installed at a comparatively low cost.

A still further object of the invention is to provide a purifying or filtering device including means for straining the oil of carbon and other large impurities, means for separating from the oil, dirt and other fine impurities held in suspension, and means for separating from the oil all magnetically attractive particles, such separating means being arranged in a convenient manner for efficient action.

A still further object of the invention is to provide an oil purifying or filtering device including a casing through which the oil is adapted to have free passage, and a separator body arranged within the casing and composed of mechanical and magnetic separating elements, so united as to permit of their conjoint removal, whereby the device may be conveniently cleansed when occasion requires.

With these and other objects in view, the invention consists of the features of construction, combination and arrangement of parts hereinafter fully described and claimed, reference being had to the accompanying drawings, in which:—

Figure 1 is a vertical longitudinal section through the crank casing of an automobile engine showing the use of the invention in an oil circulating system; Fig. 2 is a similar view showing the use of the invention in a splash system; Fig. 3 is a central vertical longitudinal section through the oil purifying or filtering device; Fig. 4 is an end elevation of the same; Figs. 5 and 6 are vertical transverse sections on the lines 5—5 and 6—6 of Fig. 3; and Figs. 7, 8, 9, 10 and 11 are detail views of elements of the separating means detached and disassociated.

In the practical embodiment of my invention I provide a casing 1, preferably consisting of an elongated tube of non-magnetic metal, said casing being substantially horizontally disposed in use and threaded at its ends to receive caps 2 and 3, provided with flanges having internally threaded portions to engage the threaded ends of the casing. The caps also have threaded apertures to receive the ends of pipe sections 4 and 5 and are provided with internal shoulders 6 at the inner ends of their threaded portions, between which and the ends of the casing are clamped screen barriers or strainers 7, arranged in spaced relation to the body walls of the caps to provide traps or receiving chambers 8. Each screen barrier or strainer 7 is preferably constructed of a pair of leather or metallic washers 9 which are disposed on opposite sides of a wire screen disk 10 of suitable mesh, the outer circumferential portion 11 of which disk, which lies between the washers, being stiffened and strengthened in any suitable manner, as by the use of a filling of solder or like material closing the cells or meshes thereof.

Arranged within the lower portion of the casing 1 between the screen barriers 7 is a separator body composed of a series of mechanical and magnetic separating elements. This separator body preferably comprises semi-circular blocks or disks 12 of felt or other suitable porous material arranged in alternation with permanent U-shaped magnets 13, the spaces or cavities 14 of which are preferably filled with small blocks or disks 15, which are preferably made of the same material as the disks 12, the upper surface of the separator composed of the aforementioned elements terminating substantially in line with the longitudinal transverse center of the casing, thus leaving at the top of the casing a free or uninterrupted flow space or channel 16 for the passage of the oil through the casing with a minimum of restriction or retardation.

In practice, either end of the casing may be employed as the inlet end, the device being interchangeable for use in this particular, but assuming, for convenience of description in setting forth the purifying action, that the pipe section 4 is connected with the inlet end and the pipe section 5 with the exit or discharge end, it will be understood that in the use of the device the impure oil enters through the pipe 4, flows through the adjacent screen barrier 7, which relieves it of its large particles of carbon, metal and other coarse impurities, which are retained in the adjacent trap 8, the body of oil thence traveling through the flow space or channel 16, which it normally fills, being separated from its finer non-magnetic and magnetically attractive impurities by the separating elements 12, 13 and 15, and finally discharging through the opposite screen barrier 7 and pipe 5, the said second screen barrier 7 serving to relieve the oil of any of the fine impurities which may escape the separating elements. The trap 8 disposed in proximity to the pipe section 7 and communicating directly therewith serves as a preliminary trap for retaining large particles or impurities when such end of the purifier is employed as the inlet end, and in the use of such end of the purifier as the outlet end serves to retain and hold any particles which may be precipitated at that point. In practice, the separator elements 12 and 15 are preferably provided with apertures 17 for the passage of a tie rod or binding element 18 provided with end washers 19 and apertured to receive retaining pins 20, whereby the said separator elements are held assembled, with the magnetic separating elements 14 clamped between the elements 12, so that, when either end cap and the associated screen barrier are removed, the combined mechanical and magnetic separator may be bodily withdrawn from the casing for convenience and facility in washing and cleaning the separating elements in gasolene or other cleaning fluid.

In the use of the device on an automobile employing a circulating system of lubrication, as shown in Fig. 1, wherein 21 designates the crank casing, 22 the engine shaft and 23 the circulating pump, the separator is disposed beneath the crank casing and suitably disposed in the circulating system, as by connecting the pipe section 4 through the medium of a coupling 24 with a conducting pipe section 25 provided with a controlling valve 26 and coupled to a supply pipe 27 communicating at its front and rear ends with the crank casing, and connecting the outlet pipe section 5 by a coupling 28 with a delivery pipe 29 leading to the pump 23 and having a controlling valve 30, the construction and arrangement thus being such that the purifier is disposed below the level of the body of oil in the crank casing or reservoir and will always remain filled by gravity with oil therefrom. It will be evident that upon closing the valves 26 and 30 and disconnecting the coupling members 24 and 28, the purifier as a whole may be detached for cleansing, repairs or other purposes, and that upon removing either of the end caps of the purifier all of the separating elements contained therein may be withdrawn for any of the purposes stated. In the operation of the circulating system, the oil traveling by gravity from the crank casing to the separator will be relieved in the latter of all of its impurities and supplied to the pump in a purified condition for return to the engine, thus preventing the constant and continued contamination of the oil and supplying the working parts of the engine with a purified oil adapted to afford perfect lubrication, and to relieve the working parts of the wear, tear and other objections caused by the presence of carbon, dirt, metallic particles and other impurities in the oil.

In the mode of use illustrated in Fig. 1 the oil is applied to the purifier and circulated therethrough both by gravity and the action of the pump, while in Fig. 2, in which I have shown the purifier arranged for use upon an engine employing the splash system of lubrication, the purifier is kept filled and supplied with oil by gravity from the crank casing and the purified oil is returned thereto by displacement due to the tilting of the parts in the travel of the vehicle up and down grades as well as to the tendency of the heavy impure oil to descend into the purifier casing and displace the lighter purified oil therefrom. As shown in Fig. 2, the casing 1 is arranged horizontally beneath the crank casing 21 and the pipe sections 4 and 5 are respectively detachably connected by the couplings 24 and 28 with supply pipe sections 31 and 32 communicating with the bottom of the crank casing at the front and rear ends thereof and provided respectively with controlling valves 33 and 34. The casing 1 is kept filled with oil by gravity in this arrangement, and the oil is purified on its passage therethrough, a portion of the oil being displaced from the casing through one or the other of its ends by the heavier impure oil from the crank casing when the vehicle tilts in one direction or the other in traveling up and down grades, whereby a sufficient circulation is established between the crank casing and purifier to effect the feed of the oil for purification.

For the purpose of increasing the efficiency of action of the separator body, for both the mechanical and the magnetic separation of the impurities, I provide the separator body as a whole with a corrugated or irregular upper surface, providing alternately arranged valleys, depressions or receiving pockets, and intervening abutments, separator walls or riffles. This construction is obtained by extending the upper surfaces of the blocks or disks 12 above the ends of the magnets 14 and blocks 15, so as to provide pockets or depressions 35 above the magnets and riffles 36 formed by upwardly projecting portions of the blocks 12, smaller and intervening pockets and riffles being produced by slotting or bifurcating the blocks 12, and sub-dividing the projecting portions thereof each into a pair of the riffles 36 and 38, while the smaller blocks 15 are also bifurcated or slotted to provide depressions or recesses 38 within the depressions or recesses 35, which depressions or recesses throughout the series of separating elements are adapted to receive and retain the dirt, particles of carbon and certain of the particles of metal separated from the oil within the casing body.

Normally, a body of oil is contained within the space or channel 16 and a slow circulation of the oil through the purifier occurs, a portion of the purified oil discharging for return to the engine, while a corresponding amount of impure oil enters to take its place. As previously described, the impure oil entering through the pipe 4 and flowing through the adjacent screen barrier 7 is relieved of its coarse particles of carbon and metal which are received in the adjacent trap 8, while in the discharge of the purified oil through the opposite screen 7 any small amount of impurities which may remain therein is filtered out by said screen. The impurities contained in the body of oil in the space 16 tend to separate therefrom by gravity, owing to the fact that the column of oil is comparatively stationary, and the dirt and other mechanical particles are retained within the pockets or recesses in the separator body, while the magnetically-attractive particles are attracted and held by the permanent magnets. The disks or blocks 12 and 15 are preferably made of comparatively loose fibered or coarse felt, and are therefore porous absorptive enough to receive and hold a certain amount of the dirt and other impurities in addition to that retained in the pockets, these separator sections being preferably formed of felt for the said reason. The magnets 14 are disposed in such relation that the opposite poles of adjacent magnets are in apposition, by which the lines of force are caused to pass in all directions, adapting the portions of the separator surface to have influence in attracting and holding the iron or steel particles in the oil, by which a greater separating efficiency is obtained. As a result, the oil entering and slowly passing through the separator is relieved in an efficient manner of all of its dirt and other non-magnetic as well as its magnetic impurities, so that it will return to the engine in a substantially pure condition, insuring better lubrication of the working parts at all times and a more efficient action of the engine due to the removal of the carbon and other impurities ordinarily passing constantly through the engine with the oil. It will, of course, be understood that at required intervals the purifier may be detached and cleansed, the construction described permitting of its ready and convenient removal as well as the removal of the separator elements therein. The arrangement of the separator elements within the bottom portion of the separator casing and the provision of a clear or non-restricted channel above the same for the passage of the oil is of material importance, as no material restriction to the flow of the oil occurs at times when the engine is running at high speed and a maximum rapidity of the supply of lubrication to the working parts is required.

I claim as my invention:

1. An oil purifying device having a horizontal chamber with means for the influx and efflux of oil at opposite ends thereof, and a separating bed or body extending along the base of said chamber and composed of magnetic and non-magnetic elements, the chamber being devoid of obstructions above said bed and providing a channel for the unobstructed passage of oil.

2. An oil filter or purifying device comprising a casing having a separating chamber, separating means in the lower portion of said chamber composed of magnetic and non-magnetic elements, conductors communicating with the ends of the casing, and screens between said conductors and the separating chamber.

3. In an oil purifying device, a casing provided with an inlet and an outlet and a separating bed partly filling said casing between said inlet and outlet and thereby forming with said casing a substantially free way for the passage of the oil through said casing above said bed, said bed comprising magnetic and non-magnetic blocks with the latter proportioned to extend above the former, substantially as described.

4. In an oil purifying device, a casing providing a clear passage for the oil to be purified, and separating means projecting upwardly into the path of the oil passing through said casing for contact by the oil and comprising elements some of which are magnetically attractive to iron impurities contained in the oil, substantially as described.

5. In an oil purifying device, a casing having a free passage therethrough for the oil and inlet and outlet means communicating with said passage, and separating means disposed in the path of the oil passing through said casing and comprising magnetic and absorptive elements disposed in abutting relation, substantially as described.

6. In an oil purifying device, a casing having a passage for the oil to be purified and inlet and outlet means communicating with said passage, and separating means in said passage comprising alternately disposed magnetic elements and absorptive elements, the magnetic elements being disposed in magnetic opposition with respect to each other, substantially as described.

7. In an oil purifying device, a casing having an inlet and an outlet and an oil flow passage, and separating means disposed in the path of the oil flowing through said passage and comprising a bed of magnetic and non-magnetic elements constructively presenting a riffled surface.

8. In an oil purifying device, a casing having an inlet and an outlet and an oil flow passage, and separating means disposed in the path of the oil flowing through said passage and comprising permanent magnets and porous felt bodies arranged to form a separator bed.

9. In an oil purifying device, a casing having an oil flow passage provided with an inlet and an outlet, and a separator bed in said passage comprising alternating main blocks of magnetic and absorptive elements, intervening elements composed of magnetic blocks having recessed upper faces and absorptive blocks seated in said recessed upper faces, and means holding the elements of the bed in assembled relation.

10. In an oil purifying device, a casing having an oil flow passage provided with an inlet and an outlet, and a separator bed in said passage comprising alternating main blocks of magnetic and absorptive elements, intervening elements composed of magnetic blocks having recessed upper faces and absorptive blocks seated in said recessed upper faces, the said main blocks and intervening absorptive blocks being recessed in their upper faces to provide pockets and riffles.

11. In an oil purifying device, the combination of an oil receptacle, a substantially horizontal casing disposed below the level of the oil receptacle, said casing having inlet and exit ends and an intervening flow passage, a connection between the receptacle and the inlet end of the casing for the flow of the impure oil by gravity from the former to the latter, a separator bed extending along the base of the flow passage and composed of magnetic and non-magnetic elements, and means connected with the outlet end of the casing for returning the purified oil to the receptacle.

12. In an oil purifying device, the combination of an oil receptacle, a substantially horizontal casing disposed below the level of the oil receptacle, said casing having inlet and exit ends and an intervening flow passage, a connection between the receptacle and the inlet end of the casing for the flow of the impure oil by gravity from the former to the latter, a separator bed extending along the base of the flow passage and composed of magnetic and non-magnetic elements, screen members between the oil flow passage and the inlet and outlet ends of the casing and forming traps outside the separating space, and means connected with the outlet end of the casing for returning the purified oil to the receptacle.

In testimony whereof I affix my signature in presence of two witnesses.

MANLY C. ROGERS.

Witnesses:
C. C. Hines,
Bennett S. Jones.